United States Patent
Pennington, Jr. et al.

(10) Patent No.: US 7,215,757 B2
(45) Date of Patent: *May 8, 2007

(54) SYSTEM AND METHOD TO PROVIDE AUTOMATED SCRIPTING FOR CUSTOMER SERVICE REPRESENTATIVES

(75) Inventors: Stanford E. Pennington, Jr., San Antonio, TX (US); Melissa L. Oldenburg, Palatine, IL (US); Benjamin J. Schubert, Schertz, TX (US); Kurt M. Joseph, Austin, TX (US); Mary K. Griffitt, Lee's Summit, MO (US); Krisinda A. Guerrero, San Antonio, TX (US)

(73) Assignees: SBC Services, Inc., San Antonio, TX (US); Southwestern Bell Telephone Company, San Antonio, TX (US); SBC Technology Resources, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/970,236

(22) Filed: Oct. 21, 2004

(65) Prior Publication Data

US 2005/0053224 A1    Mar. 10, 2005

Related U.S. Application Data

(63) Continuation of application No. 10/136,157, filed on May 1, 2002, now Pat. No. 6,856,679.

(51) Int. Cl.
*H04M 3/00* (2006.01)
*H04M 11/00* (2006.01)
*G06Q 30/00* (2006.01)

(52) U.S. Cl. ............................. 379/265.09; 379/93.12; 379/265.01; 379/265.02; 705/26

(58) Field of Classification Search ............. 379/93.12, 379/265.01, 265.02, 265.09; 705/26
See application file for complete search history.

(56) References Cited

U.S. PATENT DOCUMENTS 4,803,348 A    2/1989    Lohrey et al. .............. 235/381

(Continued)

FOREIGN PATENT DOCUMENTS

EP    0889421 A1    1/1999

(Continued)

OTHER PUBLICATIONS

PCT International Search Report Application No. PCT/US03/12756, 7 pages, Mailed Oct. 30, 2003.

*Primary Examiner*—Bing Q. Bui
(74) *Attorney, Agent, or Firm*—Baker Botts L.L.P.

(57) ABSTRACT

A disclosed method provides automated scripting to guide a customer service representative (CSR) in handling a call from a customer. Operations within the method may include displaying products and two or more purpose classifications for selection by the CSR. The purpose classifications may include (a) an add classification for customer requests to add a new product to an account and (b) a remove classification for customer requests to remove an existing product from the account. A page generator may receive input from the CSR selecting one of the purpose classifications and one of the products as pertinent to the call. In response, the page generator may automatically displaying a customized page with scripted text for the CSR to read to the customer. The scripted text may correspond specifically both to the selected purpose classification and to the selected product.

19 Claims, 6 Drawing Sheets

U.S. PATENT DOCUMENTS

| | | | | |
|---|---|---|---|---|
| 5,008,930 | A * | 4/1991 | Gawrys et al. | 379/265.11 |
| 5,164,983 | A * | 11/1992 | Brown et al. | 379/265.03 |
| 5,323,452 | A | 6/1994 | Dickman et al. | 379/201.04 |
| 5,446,653 | A | 8/1995 | Miller et al. | 364/401 |
| 5,465,291 | A | 11/1995 | Barrus et al. | 379/67.1 |
| 5,533,184 | A | 7/1996 | Malcolm | 395/161 |
| 5,794,257 | A | 8/1998 | Liu et al. | 707/501 |
| 5,897,622 | A | 4/1999 | Blinn et al. | 705/26 |
| 5,953,406 | A | 9/1999 | LaRue et al. | 379/265 |
| 5,983,227 | A | 11/1999 | Nazem et al. | 707/10 |
| 6,006,242 | A | 12/1999 | Poole et al. | 707/531 |
| 6,055,513 | A | 4/2000 | Katz et al. | 705/26 |
| 6,100,891 | A * | 8/2000 | Thorne | 715/854 |
| 6,233,332 | B1 * | 5/2001 | Anderson et al. | 379/265.09 |
| 6,243,451 | B1 | 6/2001 | Shah et al. | 379/201.03 |
| 6,249,578 | B1 | 6/2001 | Gilles et al. | 379/221 |
| 6,311,231 | B1 * | 10/2001 | Bateman et al. | 379/265.09 |
| 6,484,150 | B1 | 11/2002 | Blinn et al. | 705/26 |
| 6,546,095 | B1 | 4/2003 | Iverson et al. | 379/201.12 |
| 6,556,997 | B1 | 4/2003 | Levy | 707/10 |
| 6,684,369 | B1 | 1/2004 | Bernardo et al. | 715/513 |
| 6,704,410 | B1 * | 3/2004 | McFarlane et al. | 379/265.05 |
| 6,820,235 | B1 | 11/2004 | Bleicher et al. | 715/501 |
| 6,856,679 | B2 | 2/2005 | Pennington, Jr. et al. | 379/265 |
| 6,870,926 | B2 * | 3/2005 | Shambaugh et al. | 379/265.05 |
| 2002/0087573 | A1 | 7/2002 | Reuning et al. | 707/102 |
| 2002/0091688 | A1 | 7/2002 | Decary et al. | 707/6 |
| 2002/0154178 | A1 | 10/2002 | Barnett et al. | 345/853 |
| 2002/0198859 | A1 | 12/2002 | Singer et al. | 707/1 |
| 2003/0135826 | A1 | 7/2003 | Dozier | 715/515 |
| 2003/0140307 | A1 | 7/2003 | Bar-Yossef et al. | 715/500 |

FOREIGN PATENT DOCUMENTS

WO    02/19162 A2    3/2002

* cited by examiner

Key Account Data

| Product Description | Status | MRC | NRC |
|---|---|---|---|
| Call Waiting | OFF | $3.95 | $0 |
| Three-Way Calling | ON | $2.95 | $0 |
| ... | | | |

Transaction Records

| User | BTN | Starttime | Stoptime | Disp | NavHist | Key |
|---|---|---|---|---|---|---|
| MO3213 | 8475554753 | 04/22/02 13:12:17 | 04/22/02 13:22:59 | 44 | ING001:ING0002:INU0001:INS2499 | 1556 |
| MO3213 | 8475554545 | 04/22/02 14:34:23 | | | | 1557 |
| ... | | | | | | |

Macro Glossary

| Identifier | Replacement |
|---|---|
| ARLM1DX | $0.12 |
| SH | shipping and handling |
| SWB | Southwestern Bell |
| ... | |

Link Conditions

| Template | Conditions |
|---|---|
| INS2000 | {Customer.HasCallNotes} or {Customer.HasCallNotesPlus} and not {Customer.HasPhoneSolutionswithOCP} and not {Customer.HasPhoneSolutionsWithoutOCP} |
| INS2045 | {Customer.HasCallNotesPlus} |
| ... | |

SYSTEM AND METHOD TO PROVIDE AUTOMATED SCRIPTING FOR CUSTOMER SERVICE REPRESENTATIVES

RELATED APPLICATIONS

This application is a continuation of prior application Ser. No. 10/136,157 entitled "System and Method to Provide Automated Scripting for Customer Service Representatives" filed May 1, 2002, now U.S. Pat. No. 6,856,679.

TECHNICAL FIELD OF THE INVENTION

This invention relates in general to computer systems. In particular, this invention relates to a system, a method, and a program product to provide automated scripting for customer service representatives.

BACKGROUND OF THE INVENTION

Customer satisfaction is typically very important to vendors such as telecommunications companies. Many vendors therefore employ specially trained customer service representatives (CSRs) to help ensure that calls from customers with questions or requests pertaining to the products that the company provides are handled effectively and efficiently. Effectiveness and efficiency are typically important goals for a customer service department. To increase the effectiveness and efficiency of CSRs, some companies provide CSRs with paper documents to be used for guidance when handling customer calls. Such a document may be known as a "contact strategy document" or a "CSR script." For instance, a contact strategy document may be designed for handling calls from customers who want to add products to or remove products from their existing accounts. Such as contact strategy document may guide a CSR through steps designed save products from being cancelled and to upsell customers.

While handling a customer call, a CSR may also interact with various screens from an enterprise system, such as a legacy mainframe application or database. For example, the CSR may use function keys to navigate through various legacy application screens to retrieve account data for the customer, data about the company's goods and services, etc. Accordingly, for a given call, the CSR may be required to perform the following tasks: (a) converse with the customer; (b) navigate through multiple legacy application screens; (c) refer repeatedly to the contact strategy document; (d) save existing products by producing explanations that overcome customer objections; (e) upsell available products by describing their benefits to the customer; and (f) process customer orders by manually entering data into various fields in the legacy application screens.

Collectively, these tasks require significant mental effort, and they demand the memorization of considerable amounts of information by the CSR. These requirements may overwhelm many CSRs, and, as a result, CSRs may navigate through the enterprise application screens in an inefficient manner and may fail to use the prescribed contact strategy. Consequently, overwhelmed CSRs may fail to meet save and upsell goals, customer satisfaction may suffer, and the service provider may lose revenue that might have been realized, had the CSR performed as expected.

BRIEF DESCRIPTION OF THE DRAWINGS

A more complete understanding of the present invention and advantages thereof may be acquired by referring to the appended claims and to the following description of one or more example embodiments, with associated drawings. In the drawings:

DETAILED DESCRIPTION OF AN EXAMPLE EMBODIMENT

Figure 1:
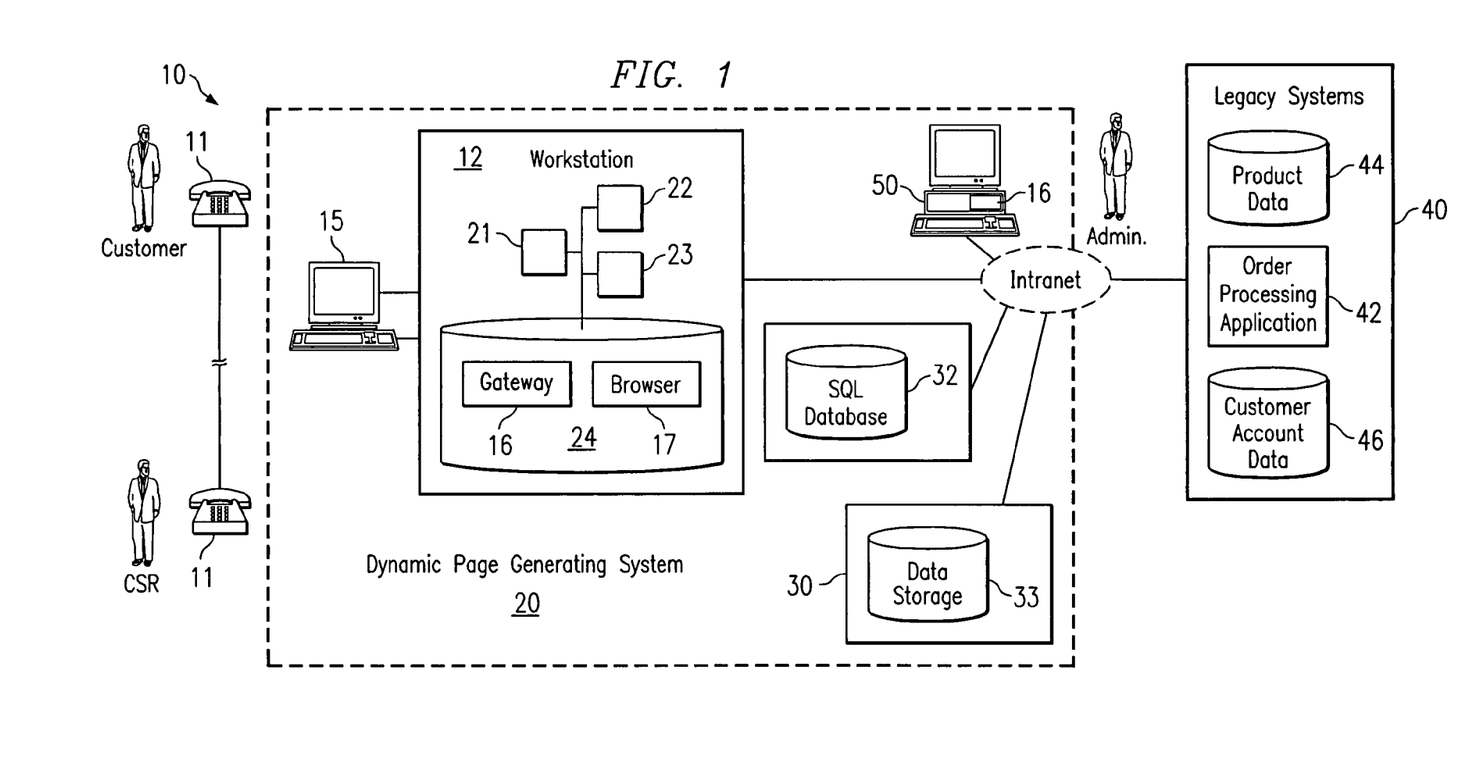
FIG. 1 presents a block diagram of a distributed data processing system including an example embodiment of a dynamic page generating system according to the present invention.

FIG. 1 presents a block diagram of an example embodiment of a distributed data processing system 10 that includes many components which cooperate to provide automated scripting for customer service representatives according to the present invention. In the example embodiment, a customer may use a telephone 11 to call a customer service representative (CSR) with a request for information about or changes to the customer's account with a service provider. The CSR may use a workstation 12 with a video display 15 to interact with a dynamic page generating system (DPGS) 20.

In the example embodiment, DPGS 20 provides an "end-to-end" series of scripted messages that increase CSR efficiency and enhance customer satisfaction. The series of scripted messages may be referred to as an overlay, and the overlay is considered "end-to-end" because the series of scripted messages may guide and support CSR functions from the beginning to the end of the customer contact. Moreover, DPGS 20 may generate the overlay by automatically combining information from multiple remote sources and dynamically customizing the content presented to the CSR. For instance, a multi-state database in an enterprise system may contain information on thousands of products, universal service order codes (USOCs), pricing, field identifiers (FIDs), etc. However, DPGS 20 may filter that data and present the CSR only with relevant portions of that data (e.g., only data relating to products available in the state of the customer on the call). Furthermore, DPGS 20 may provide a consolidated interface for accessing tools required by the CSR.

DPGS 20 may reduce the mental effort and demands for memorization required of the CSR. Thus, an end-to-end scripting overlay according to the invention may simplify the job of the CSR and allow CSRs that would otherwise be overwhelmed to handle customer calls more effectively. Consequently, CSRs may enjoy increased save and upsell performance, resulting in increased revenue for the product provider and increased satisfaction for the customer. For purposes of this document, (a) the term "products" may be used to refer to goods and to services; (b) to "upsell" is generally to convince the customer to accept a new product for the account that provides a more favorable business result (such as increased revenue) for the provider of that product, relative to an existing product for the customer; (c) and to "save" a product generally means to prevent the customer from removing the product from the account.

In the example embodiment, the overlay has the following properties: (a) includes customer account information scraped from enterprise screens; (b) displays the customer account information in a user friendly format (e.g., by showing only the products that are either currently in a customer's subscription or available to the customer; (c) directs CSR navigation through a series of hyperlinked pages that are ordered based on the CRU contact strategy; (d) provides the CSR with scripted statements or messages about products, so the CSR may use the scripted messages, including product benefits and prices, to overcome customer objections; (e) populates appropriate enterprise application fields with customer order information, so the CSR need only review the information to complete the order; (f) logs CSR navigation through hyperlinked pages to a database, so that usage and save/upsell reports can be generated; and (g) allows authors or administrators to create, modify, and delete content for the hyperlinked pages in a way that allows pages with the new content to be delivered to CSR desktops in real time (i.e., while the pages are being used by CSRs without disrupting CSR operation).

However, DPGSs according to the present invention are not limited to providing pages for CSRs, but may be used in alternative embodiments to dynamically generate pages for other purposes. For instance, a DPGS may be used by an automotive company to generate pages to allow customers to choose windshield wiper replacements for their make and model car, or to generate pages for troubleshooting an appliance, or basically any rules-based decision making, where key information combined with rules produces discrete outcomes that are predictable.

For purposes of this disclosure a page is a collection of content (e.g., an html file, an XML file, a text file, etc.) that is ready to be delivered to a user interface module, such as a web browser object, for presentation to a user. In the illustrated embodiment, the overlay is implemented by dynamically generating the pages that will form the overlay, based on a variety of influences, such as user input from the CSR, data in DPGS 20, and data from remote systems. Those pages may be presented to the CSR in a display 15 of a workstation 12 within DPGS 20. For example, a browser object 17 may be used to display the pages in a graphical user interface, and a pointing device such as a mouse may be used to navigate from page to page within the overlay. DPGS 20 may use Visual Basic routines and a dynamic-html engine, for example, to allow the CSR to access existing enterprise software or data.

Workstation 12 may include nonvolatile data storage such as one or more disk drives 24, volatile data storage such as random access memory (RAM) 22, one or more central processing units (CPUs) 21, and input/output (I/O) facilities 23 such as a network interface card or module. Gateway 16 may be implemented as a software application with various modules of computer instructions and data. Gateway 16 may generally reside on disk drive 24, and may be loaded into RAM 22 and executed by CPU 21 on demand. Another workstation 50 may include generally similar components, including gateway 16. As described in greater detail below, and an administrator may use workstation 50 to modify various components of DPGS 20.

As described in greater detail below, gateway 16 may automatically and dynamically generate customized pages for the CSR, based on data sources such as user input from the CSR, data in remote systems 30, and data from enterprise systems such as legacy systems 40. Remote client/server systems 30 may contain, for example, an SQL database 32 and one or more other types of data storage 33. Legacy systems 40 may include various applications and related collections of data. For example, the resources in legacy systems 40 may include an order processing application 42, a file of product data 44, a file of customer account data 46, and other applications or databases. Gateway 16 may communicate with components internal and external to DPGS 20 either directly or via a network platform such as a local area or wide area intranet 14. Data used by DPGS 20 and components of DPGS 20 may thus reside on different hardware devices in distributed data processing system 10.

Figure 2:
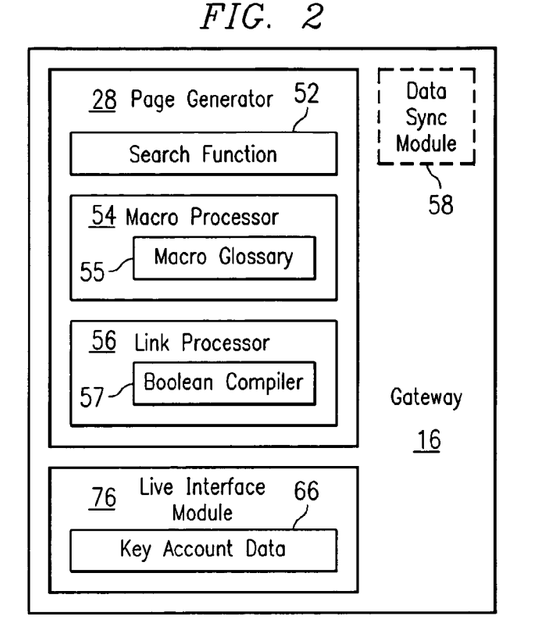
FIG. 2 presents a block diagram illustrating various parts of an example embodiment of a gateway in the dynamic page generating system of FIG. 1.

FIG. 2 presents a block diagram illustrating various parts of gateway 16 from FIG. 1. As illustrated, gateway 16 may include a live interface module 76 and a page generator 28. As described in greater detail below with reference to FIG. 10, live interface module 76 may retrieve data pertaining to a customer from legacy systems 40, refine that data, and retain the refined customer data for use by page generator 28. The refined customer data may be retained in RAM 22 or disk drive 24, and that data may be referred to as key account data 66. For instance, gateway 16 may retain key account data 66 for a customer in RAM 22 only while the CSR is handling a call form that customer.

Figure 6:
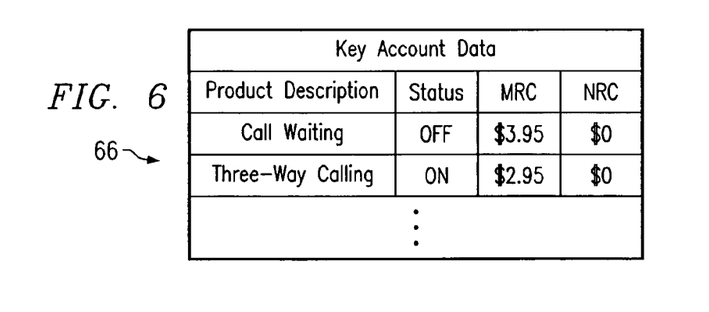
FIG. 6 depicts example key account data records.

FIG. 6 depicts example records in key account data 66. As indicated, each record may include a product description and a status field indicating whether the customer is already subscribed to that product (i.e., whether the product is "on" the account). Each record may also list the cost of any associated non-recurring charge (NRC) and monthly recurring charge (MRC). In the example embodiment, the records identify all of the products on the customer account and all of the products available for the customer account.

Page generator 28 may perform most or all of the processing required to dynamically generate the pages to be presented to the CSR. That processing may be performed by a number of related components, such as a search function 52, a macro processor 54, and a link processor 56. A macro glossary 55 in macro processor 54 may define associations between predetermined macro identifiers and respective replacement text strings. A macro identifier and the corresponding replacement text string may be referred to collectively as a macro.

Link processor 56 may use a Boolean compiler 57 to evaluate predefined link conditions. In the example embodiment, Boolean compiler 57 may be implemented to evaluate a statement (that may be simple or compound) using Boolean programming concepts to evaluate if a statement is true or false. Boolean logic generally allows several operators such as: greater than, less than, equal to, is between two ranges, outside two ranges using operators like "AND," "OR" and "NOT." The relationship of Boolean compiler 57 and link processor 56, provides additional instructions to page Generator 28 to allow the administrator to "HIDE" or "DIM" the link from the page. The interrelationship is further enhanced with availability to combine and process statements composed from multiple data sources. The Boolean Compiler will recognize elements from multiple sources such as: "Manage Products" (product data 44), customer account data 46, data storage 33 or SQL database 32. The Boolean compiler is accessible to the administrator from the "Manage Conditions" and "Edit Conditions' functions."

Page generator 28 may use search function 52 to find macro identifiers and links in panel templates, and page generator 28 may use macro processor 54 and link processor 56 to dynamic generate customized pages from the panel templates, as described in greater detail below.

In addition, gateway 16 may include a data sync module 58 that, when activated by an administrator, updates product data in DPGS 20 to coincide with the product data in legacy systems 40. For instance, data sync module 58 may keep a table of product data 78 in SQL database 32 relatively up to date with changes to product data in legacy systems 40. In addition, when building product data 78, data sync module 58 may process or refine that data to make it more user friendly or easier to present or understand in a user interface. For instance, cryptic codes or abbreviations for products may be replaced with plain text product descriptions, such as "Call Waiting." However, data sync module 58 may be inaccessible to CSRs.

Figure 3:
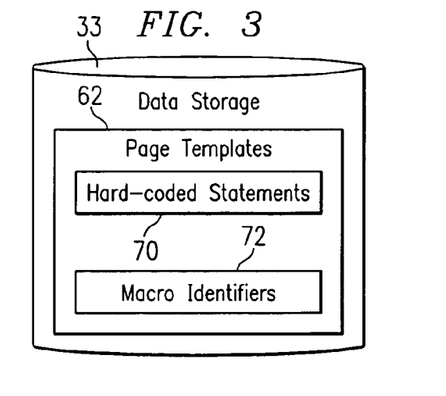
FIG. 3 presents a block diagram of a data storage device containing panel templates for the dynamic page generating system of FIG. 1.
Figure 5:
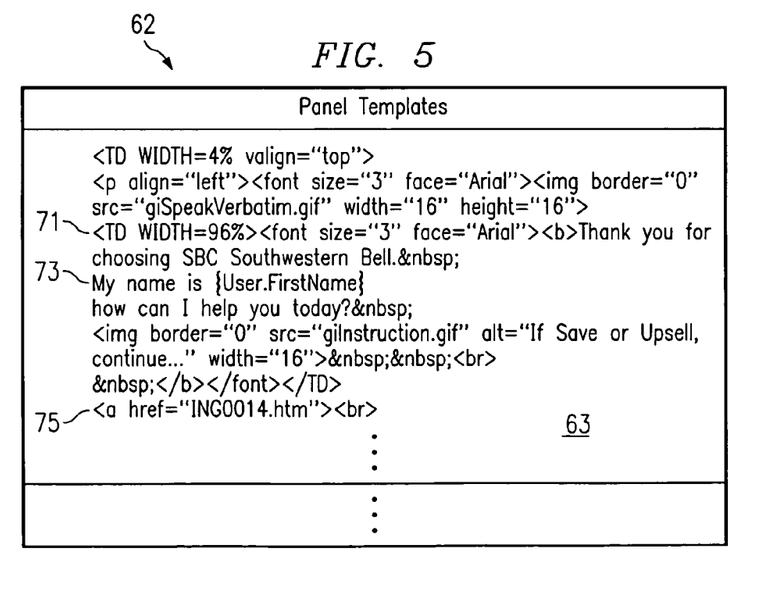
FIG. 5 depicts a portion of an example panel template.

FIG. 3 presents a block diagram of data storage 30, which contains panel templates 62 for DPGS 20. Those templates typically include content that may or may not be presented to the CSR, depending on influences such as the nature of the customer contact and the progress of the CSR through interaction with a customer, as described in greater detail below. FIG. 5 depicts a portion of an example panel template. As illustrated, each panel template typically includes multiple hard-coded statements 71, macro identifiers 73, and links 75. In one embodiment, panel templates 62 may include hundreds of individual panel templates 63. Hard-coded statements 71 may contain standard html code, for instance, as well as macro identifiers 73 and links 75.

Figure 4:
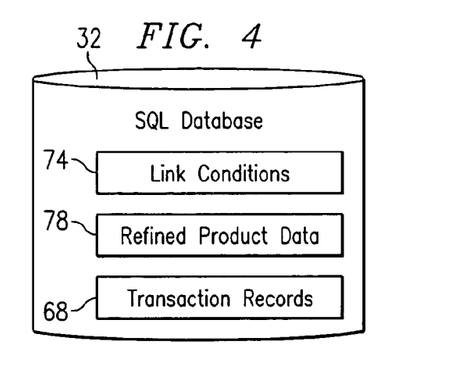
FIG. 4 presents a block diagram of a database containing various collections of data for use by the dynamic page generating system of FIG. 1.
Figure 9:
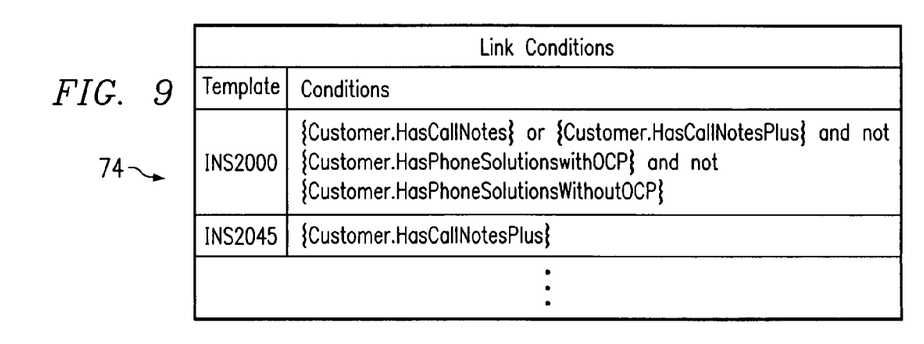
FIG. 9 depicts example link conditions.

FIG. 4 presents a block diagram of SQL database 32, illustrating certain collections of data (e.g., files or tables) used by DPGS 20. In the example embodiment, SQL database 32 includes tables for link conditions 74, refined product data 78, and transaction records 68. FIG. 9 depicts example link conditions 74. As shown, each link condition includes a template identifier and a condition specification. In the example embodiment, link conditions 74 reflect the business rules and process rules for the contact strategy, and link conditions 74 are used to help force the CSR to use the prescribed contact strategy. For example, link conditions 74 may cause page generator 28 to include only those links from a panel template that match the proper steps for the CSR to follow, according to the contact strategy. Consequently, the resulting customized page may reduce or eliminate any likelihood that the CSR might diverge from the proper process by, for example, selecting a link to an inappropriate page.

Figure 7:
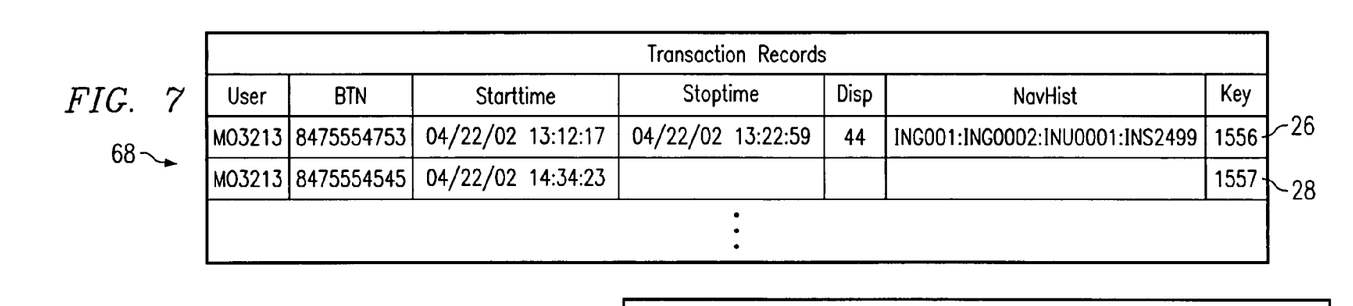
FIG. 7 depicts example transaction data records.

FIG. 7 depicts example transaction records 68. In the example embodiment, each transaction record includes data relating to a particular customer call. As shown at record 26, when the transaction record is created at the beginning of the call, some of the fields may be empty. However, when the call ends, the records will typically include data for fields such as User, which identifies the CSR that handled the call, Billing Telephone Number (BTN), which identifies the customer account involved, Starttime, Stoptime, a Disposition code, and Navigation history identifying the panels that were presented for the CSR, and a record key.

Figure 8:
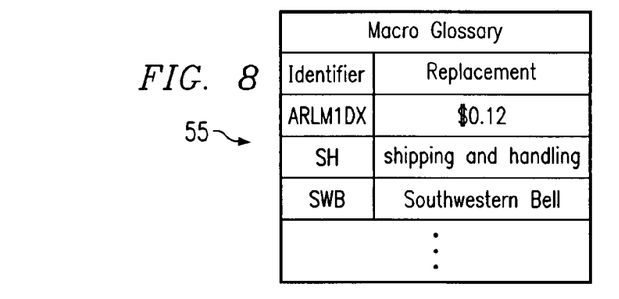
FIG. 8 depicts example macro identifiers and respective replacement text strings.

FIG. 8 depicts example macro identifiers and respective replacement text strings. For instance, macro glossary 55 associates the macro id "ARLM1DXI" with the replacement text string "$0.12." Similarly, macro glossary 55 associates the macro id "SH" with the replacement text string "shipping and handling."

Figure 10:
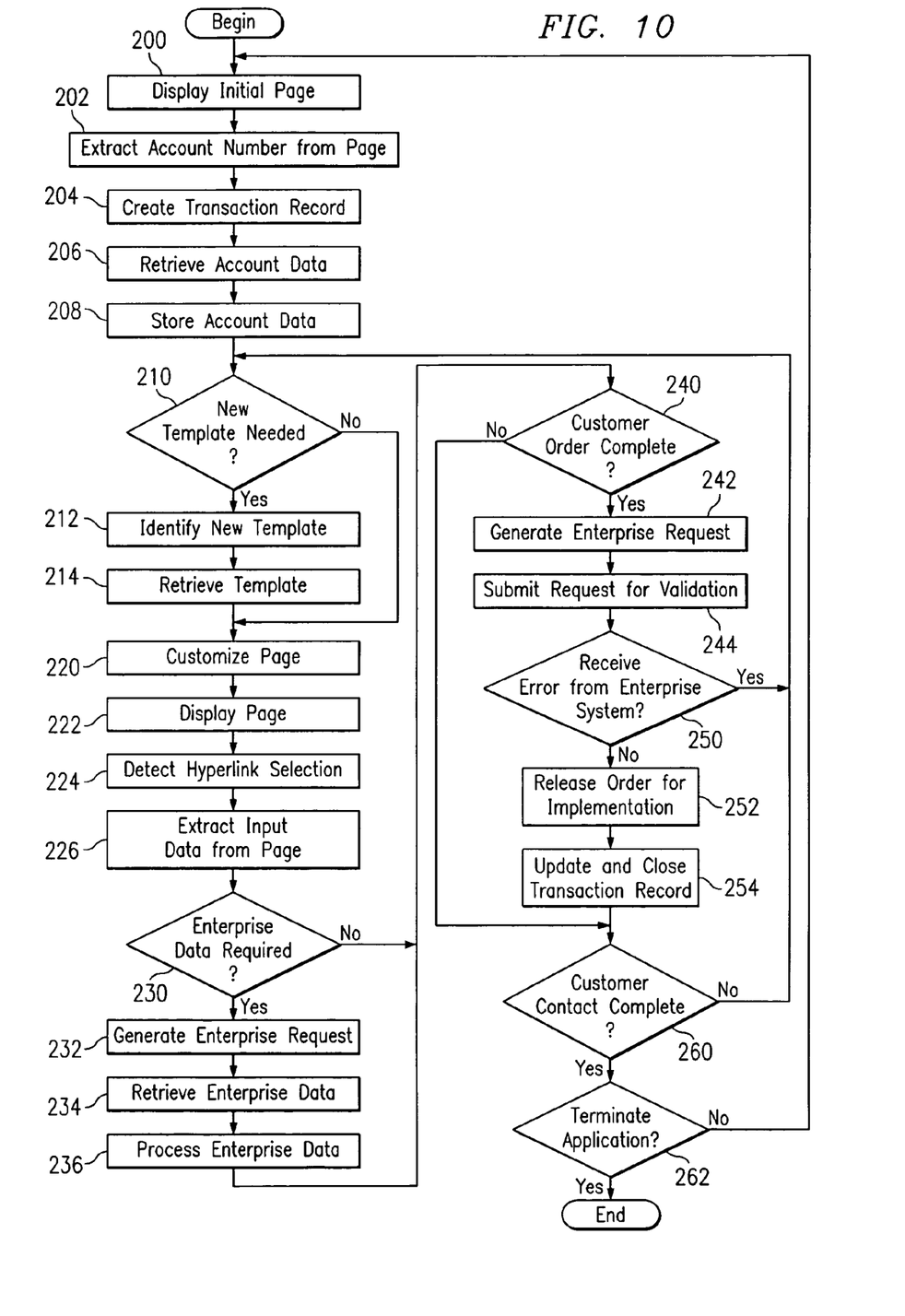
FIG. 10 presents a flowchart of an example embodiment of a method for providing automated scripting for customer service representatives according to the present invention.

FIG. 10 depicts a flowchart of an example process for providing automated scripting for CSRs. That process begins with a CSR stationed at workstation 12 and with gateway 16 executing on workstation 12. At block 200, page generator 28 causes workstation 12 to display an initial page for the CSR. The initial page may include an input field for receiving customer identification information. When the CSR receives a customer call, the CSR may read a prescribed message from the initial page to greet the customer and ask the customer for identifying information, such as a name, address, telephone number, or account number. Upon receiving the identifying information, the CSR may enter that information into the initial page and then select an object on the page such as a hyperlink to proceed to the next step.

At block 202, page generator 28 may extract the identifying information from the page, and at block 204, page generator 28 may create a transaction record used to save information about the interaction between the CSR and DPGS 20. At block 206, live interface module 76 may generate an enterprise request and retrieve account data from legacy systems 40. Gateway 16 may then store the account data as key account data 66. For instance, that data may include the account number, the current services on the account, and the services available for the account. At block 210, page generator 28 may determine whether a new template is needed. If so, at block 212 page generator 28 may determine which new template should be used. Page generator 28 may retrieve that template from panel templates 62 at block 214.

Then, after the new template is retrieved, or if it is determined that a new template is not needed, page generator 28 may customize a new page to be displayed at workstation 12 for the CSR. If no new template was retrieved, the new customized page may be based on the old panel template. To generate the new customized page, search function 52 may examine the contents of the selected panel template to locate links and macro identifiers. Hard-coded statement may generally be copied over from the selected panel template to the customized page being generated. However, when a macro identifier is found, macro processor 54 may replace each macro identifier with the corresponding replacement text from macro glossary 55. For instance, with reference to FIG. 5, the macro identifier {user.firstname} may be replaced with the first name of the CSR.

Furthermore, when a link is found, link processor 56 may search for a corresponding link condition in the table of link conditions 74. If such a link condition is found, Boolean compiler 57 may be used to evaluate whether the link condition is true or false. If the link condition is true, the link may be copied over to the customized page. If the link condition evaluates to false, however, the content in the panel template that corresponds to the link may be omitted from the customized page. For instance, with reference to FIGS. 5 and 9, when the link <a href="ING0014.htm"> is detected, link processor 56 may evaluate a row in the table of link conditions 74 for the template "ING0014.htm." If that link condition evaluates as false, the content associated with that link may be omitted from the customized page. (In FIG. 5, the content associated with link 75 is not expressly illustrated, although it typically would follow link 75.)

Referring again the FIG. 10, page generator 28 may then cause workstation 12 to display the customized page at block 222. The CSR may then use the displayed page as a guide for interaction with the customer. For instance, the initial screen may include a greeting for the CSR to use in response to the call from the customer, and the first customized page may include various objects for the CSR to use to specify the nature of the call. Alternatively, the initial page may also be customized. For instance, one customized page may include various purpose classifications, including an add classification for customer requests to add a new product to an account, and a remove classification for customer requests to remove an existing product from the account. In addition, that customized page or a subsequent page may display products for selection by the CSR to indicate which product or products are pertinent to the call. At block 224, page generator 28 may detect that the CSR has selected an object such as a hyperlink on the customized page, and at block 226, page generator 28 may extract input data from the page. For example, page generator 28 may determine which of the purpose classifications was selected by the CSR and which of the products was selected by the CSR.

In addition, the page generator 28 evaluates changes made to the product or pricing tab contents based on changes discussed by the CSR and Customer interaction. Changes made to the pricing tab allow the CSR and Customer to determine the new monthly and nonrecurring charges based on changes to their account. This is for comparative reasons, allowing customers and CSR's to price several options without submitting an order blindly. The Product tab takes instructions from commands contained within the script pages, allowing the CSR to rarely interact with it. However, the CSR has access to view and change (add, remove, save) any product returned from the legacy system. This allows the CSR to quickly make changes without using the script or to make changes to non scripted products.

At block 230, page generator 28 may determine whether enterprise data is required, based on the input data from the page. If enterprise data is required, page generator may generate an enterprise request, use that request to retrieve the enterprise data from legacy systems 40, and process the enterprise data as depicted at blocks 232, 234, and 236. For example, processing the enterprise data may include operations such as translating the legacy account data into a format more suitable for a user interface, storing the translated data as key account data, determining available services for the account in question, etc.

At block 240, if enterprise data was not required at block 230, or if enterprise data has been retrieved and processed, page generator 28 determines whether a customer order has been completed. For example, page generator 28 may determine whether the CSR has selected an object associated with a command to process a customer order. In addition, page generator 28 may require the CSR to confirm the order, for example in a confirmation page summarizing the suggested changes. As depicted at block 242, if a customer order is complete, page generator 28 may generate an enterprise request formatted as required for order processing application 42. Page generator 28 may then submit the request for validation at block 44, for instance by transmitting it to order processing application 42. At block 250, if an error is received from legacy systems 40, the process may return to block 210, with page generator 28 determining whether a new template is needed, for example to provide instructions for the CSR to overcome the problems with the submitted order. However, if no error is received, the process may pass from block 250 to block 252, and page generator 28 may then release the order for implementation. The order is released into the legacy system once the legacy system is ready to accept the order and allows the CSR to submit the transaction. Once released, the order image is distributed to various parts of the company.

Gateway 16 may then update and close the transaction record for this call at block 254. Then, after the transaction record is closed or if page generator 28 determined that there was no completed customer order to process at block 240, page generator 28 may determine whether the customer contact is complete at block 260. For instance, this determination may be made by reference to input received from the CSR, such as the selection of a customer-contact-complete object. If the customer contact is not complete, the process may return to block 210, with page generator 28 deciding whether a new template is required and continuing to provide customized pages for the CSR as described above. Otherwise, gateway 16 may determine whether the application should be terminated, for instance in response to input from a network administrator. If the application is not being terminated, the process may return to block 200, with page generator 28 displaying the initial page in workstation 12. Otherwise, the application may end.

Figure 11:
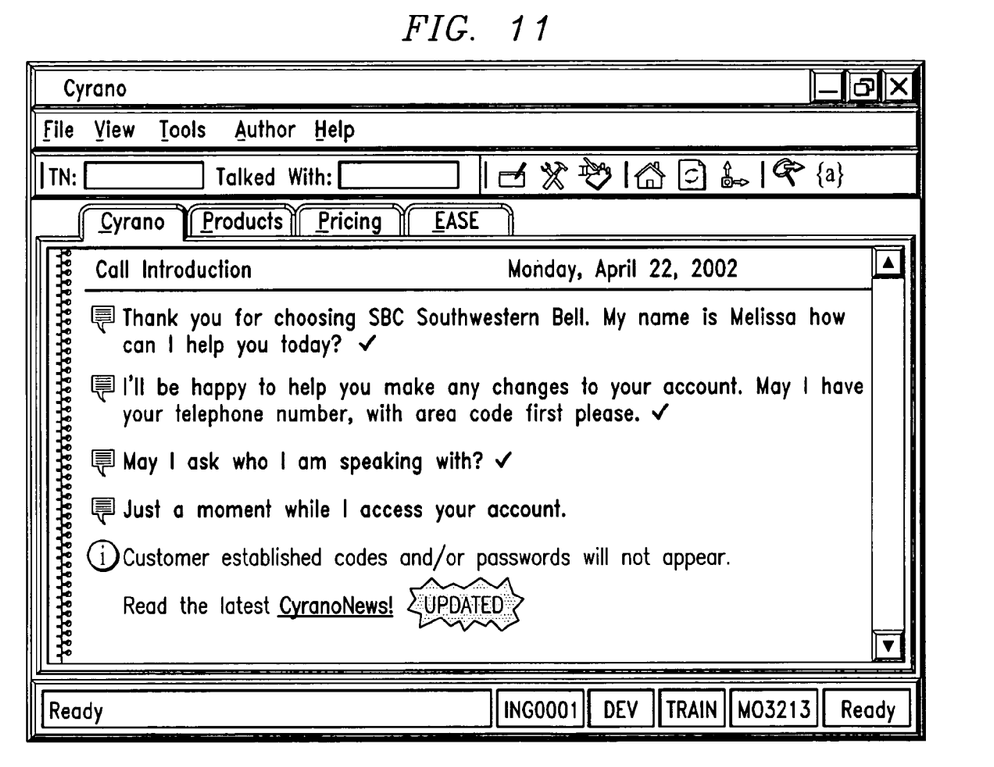
FIG. 11 depicts an example user interface with scripted messages generated according to the process illustrated in FIG. 10.

FIG. 11 depicts an example user interface with scripted messages generated according to the process of FIG. 10. Specifically, FIG. 11 illustrates an example of output that may be produced in display 15 when a customized page is fed into to a web browser object in workstation 12. For instance, the customized page may be the initial page, and the generation of that page may have included the step of replacing a macro identifier in a corresponding panel template with the first name of the CSR, "Melissa."

Figure 12:
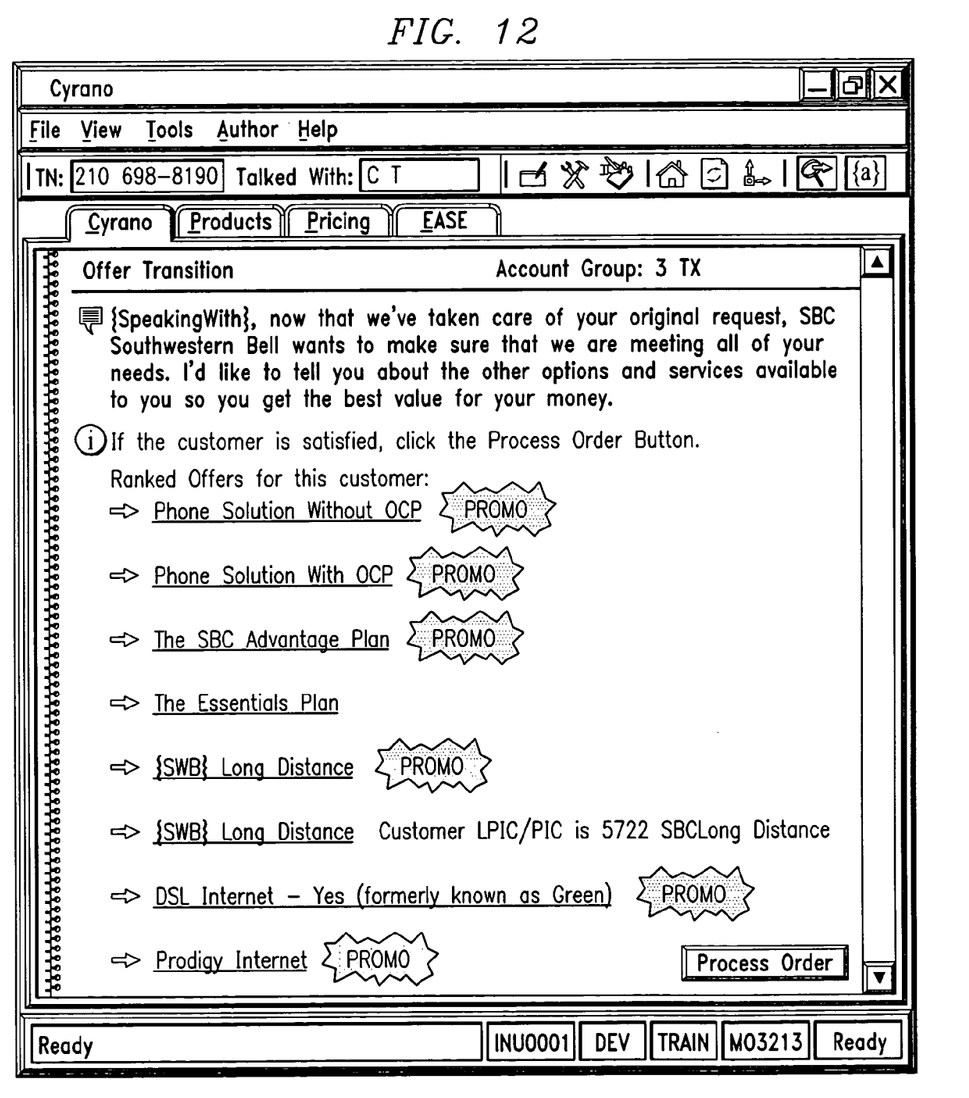
FIG. 12 depicts an example user interface with scripted messages generated according to FIG. 10.

FIG. 12 depicts another example of output that may be produced when a customized page is fed into to a web browser object. Is indicated by the hollow arrows at the bottom of the screen, that page includes a number of hyperlinks. However, when the page was generated, numerous additional hyperlinks may have been omitted as a result of evaluation results for link conditions associated with those links. For instance, the illustrated screen provides guidance for upselling a customer, and it is based on a corresponding template. If link processor 56 found any links in that template relating to products already on the customer account, page generator 28 may have omitted the content for those links from the page. For example, if the template included a link to upsell Call Waiting, but the customer account already included Call Waiting, the link for Call Waiting would be omitted from the page. Boolean compiler 57 in link processor 56 may use the key account data for the customer when evaluating the link conditions in a given panel template. Other components that may be used by Boolean compiler 57 to evaluate link conditions include combinations of elements such as greater than, less than, equal to, true and false, is a product is available, subscribed to, as well as the value or range of marketing intelligence data that may reside in data storage 33 or SQL database 32.

One of the advantages provided by DPGS 20 is that it helps to increase the effectiveness and efficiency of CSRs and enhance customer satisfaction. Another advantage is that DPGS 20 uses data from multiple different sources to automatically generate pages with highly customized, consolidated content for a user interface. For instance, the customized page may be based on a panel template, but DPGS 20 may automatically omit and replace different elements of the template when building the customized page, based on influences such as user input, predefined business rules, etc. One DPGS strength is suppressing non-relevant data, therefore only presenting relevant information to the CSR, eliminating non-value-added clutter or information, allowing the CSR to talk freely with their customer. The DPGS combines business rules and business process intelligence together with data to make simple and complex decisions in real time.

Although the present invention has been described with reference to an example embodiment, those with ordinary skill in the art will understand that numerous variations of the example embodiment could be practiced without departing from the scope and spirit of the present invention. For purposes of illustration, an example distributed system has been described. However, one of ordinary skill in the art will appreciate that alternative embodiments could be deployed with many variations in the number and type of components in the network, the network protocols, the network topology, the distribution of various software and data components among the hardware systems in the network, and myriad other details without departing from the present invention.

The example embodiment has also been described with reference to objects such as hyperlinks. However, other types of interface objects or data items may be used in alternative embodiments to provide similar functionality. Also, although web browsers are used to produce the user interface screens in the example embodiment, different technologies may be used in alternative embodiments to provide user interfaces in accordance with the present invention.

It should also be noted that the hardware and software components depicted in the example embodiment represent functional elements that are reasonably self-contained so that each can be designed, constructed, or updated substantially independently of the others. In alternative embodiments, however, it should be understood that the components may be implemented as hardware, software, or combinations of hardware and software for providing the functionality described and illustrated herein. In alternative embodiments, information handling systems incorporating the invention may include personal computers, mini computers, mainframe computers, distributed computing systems, and other suitable devices.

Alternative embodiments of the invention also include computer-usable media encoding logic such as computer instructions for performing the operations of the invention. Such computer-usable media may include, without limitation, storage media such as floppy disks, hard disks, CD-ROMs, read-only memory, and random access memory; as well as communications media such wires, optical fibers, microwaves, radio waves, and other electromagnetic or optical carriers. The control logic may also be referred to as a program product.

Many other aspects of the example embodiment may also be changed in alternative embodiments without departing from the scope and spirit of the invention. The scope of the invention is therefore not limited to the particulars of the illustrated embodiments or implementations but is defined by the appended claims.

What is claimed is:

1. A method comprising:
   obtaining information identifying a first party in conjunction with a communication between a first party and a first party service representative (CSR);
   obtaining content related to the identified first party;
   generating a script based, at least in part, on the obtained content; and
   displaying the generated script to the CSR while the communication is still in progress.

2. The method of claim 1, further comprising:
   concurrently displaying content from at least two different databases and the generated script using a consolidated interface.

3. The method of claim 1, wherein displaying the generated script further comprises:
   displaying links to content stored in at least one of a plurality of different databases.

4. The method of claim 3, further comprising:
   changing an appearance of one or more links to indicate a likelihood that a particular link is relevant to the communication.

5. The method of claim 1, wherein generating the script further comprises:
   maintaining a macro glossary defining associations between identifiers and replacement text.

6. The method of claim 1, further comprising:
   modifying the script based on information provided to the CSR during the communication; and
   displaying the modified script to the CSR.

7. An information handling system comprising:
   at least one processor;
   memory operably coupled to said at least one processor; and
   a program of instructions capable of being stored in said memory and executed by said processor, said program of instructions configured to execute a method comprising:
      obtaining information identifying a first party during a communication between a first party and a first party service representative (CSR);
      obtaining content related to the identified first party;
      generating a script based, at least in part, on the obtained content; and
      displaying the generated script to the CSR while the communication is still in progress.

8. The information handling system of claim 7, wherein the method implemented by the program of instructions further comprises:
   concurrently displaying content obtained from at least two different databases and the generated script using a consolidated interface.

9. The information handling system of claim 8, wherein the method implemented by the program of instructions further comprises:
   displaying links to content stored in at least one of the plurality of different databases.

10. The information handling system of claim 9, wherein the method implemented by the program of instructions further comprises:
    changing an appearance of one or more links to indicate a likelihood that a particular link is relevant to the communication.

11. The information handling system of claim 7, further comprising:
    modifying the script based on information provided to the CSR during the communication; and
    displaying the modified script to the CSR.

12. The information handling system of claim 11, wherein modifying the script further comprises:
    providing links to additional script content based on information provided to the CSR during the communication.

13. A computer readable medium tangibly embodying a program of executable instructions, the program of executable instructions comprising:
- a live interface module to retrieve information pertaining to a first party in conjunction with a communication between the first party and a customer service representative (CSR);
- a page generator to generate pages based on the retrieved information and display the pages to the CSR, wherein the pages include a script suitable for being read to the first party by the CSR.

14. The computer readable medium of claim 13, wherein the live interface module obtains information from at least two different databases.

15. The computer readable medium of claim 13, wherein the page generator displays first party account information to the CSR in a format that includes only products that are either currently subscribed to by the first party or available to the first party.

16. The computer readable medium of claim 13, wherein the page generator directs CSR navigation through a series of hyperlinked pages during the communication.

17. The computer readable medium of claim 16, wherein the page generator operable to log the CSR navigation through the series of hyperlinked pages to a log database.

18. The computer readable medium of claim 13, wherein the live interface module retrieves the information pertaining to the first party from a legacy system and refines the retrieved data to retain key account data indicating products subscribed to by the first party and products available to the first party.

19. The computer readable medium of claim 18, wherein the page generator includes a search module to find macro identifiers and links in a template, a macro processor to replace macro identifiers with replacement text, and a link processor to evaluate link conditions.

* * * * *

UNITED STATES PATENT AND TRADEMARK OFFICE
CERTIFICATE OF CORRECTION

| | |
|---|---|
| PATENT NO. | : 7,215,757 B2 |
| APPLICATION NO. | : 10/970236 |
| DATED | : May 8, 2007 |
| INVENTOR(S) | : Stanford E. Pennington, Jr. et al. |

It is certified that error appears in the above-identified patent and that said Letters Patent is hereby corrected as shown below:

On the Title Page (57)   ABSTRACT

Should read: A disclosed method provides automated scripting to guide a customer service representative (CSR) in handling a call from a customer. Operations within the method may include displaying products and two or more purpose classifications for selection by the CSR. The purpose classifications may include (a) an add classification for customer requests to add a new product to an account and (b) a remove classification for customer requests to remove an existing product from the account. A page generator may receive input from the CSR selecting one of the purpose classifications and one of the products as pertinent to the call. In response, the page generator may automatically ~~displaying~~ display a customized page with scripted text for the CSR to read to the customer. The scripted text may correspond specifically both to the selected purpose classification and to the selected product.

The paragraph beginning on line 21 of column 1:

Should read: Customer satisfaction is typically very important to vendors such as telecommunications companies. Many vendors therefore employ specially trained customer service representatives (CSRs) to help ensure that calls from customers with questions or requests pertaining to the products that the company provides are handled effectively and efficiently. Effectiveness and efficiency are typically important goals for a customer service department. To increase the effectiveness and efficiency of CSRs, some companies provide CSRs with paper documents to be used for guidance when handling customer calls. Such a document may be known as a "contact strategy document" or a "CSR script." For instance, a contact strategy document may be designed for handling calls from customers who want to add products to or remove products from their existing accounts. Such ~~as~~ a contact strategy document may guide a CSR through steps designed to save products from being cancelled and to upsell customers.

The paragraph beginning on line 24 of column 4:

Should read: FIG. 2 presents a block diagram illustrating various parts of gateway 16 from FIG. 1. As illustrated, gate 16 may include a live interface module 76 and a page generator 28. As described in greater detail below with reference to FIG. 10, live interface module 76 may retrieve data pertaining to a customer from legacy systems 40, refine that data, and retain the refined customer data for use by page generator 28. The refined customer data may be retained in RAM 22 or disk drive 24, and that data may be referred to as key account data 66. For instance, gateway 16 may retain key account data 66 for a customer in RAM 22 only while the CSR is handling a call ~~form~~ from that customer.

UNITED STATES PATENT AND TRADEMARK OFFICE
CERTIFICATE OF CORRECTION

PATENT NO. : 7,215,757 B2
APPLICATION NO. : 10/970236
DATED : May 8, 2007
INVENTOR(S) : Stanford E. Pennington, Jr. et al.

It is certified that error appears in the above-identified patent and that said Letters Patent is hereby corrected as shown below:

The paragraph beginning on line 55 of column 4:

Should read: Link processor 56 may use a Boolean compiler 57 to evaluate predefined link conditions. In the example embodiment, Boolean compiler 57 may be implemented to evaluate a statement (that may be simple or compound) using Boolean programming concepts to evaluate if a statement is true or false. Boolean logic generally allows several operators such as: greater than, less than, equal to, is between two ranges, outside two ranges using operators like "AND," "OR" and "NOT." The relationship of Boolean compiler 57 and link processor 56, provides additional instructions to page Generator 28 to allow the administrator to "HIDE" or "DIM" the link from the page. The interrelationship is further enhanced with availability to combine and process statements composed from multiple data sources. The Boolean Compiler will recognize elements from multiple sources such as: "Manage Products" (product data 44), customer account data 46, data storage 33 or SQL database 32. The Boolean compiler is accessible to the administrator from the "Manage Conditions" and ~~"Edit Conditions' functions.~~" "Edit Conditions" functions.

The paragraph beginning on line 1 of column 7:

Should read: Referring again ~~the~~ to FIG. 10, page generator 28 may then cause workstation 12 to display the customized page at block 222. The CSR may then use the displayed page as a guide for interaction with the customer. For instance, the initial screen may include a greeting for the CSR to use in response to the call from the customer, and the first customized page may include various objects for the CSR to use to specify the nature of the call. Alternatively, the initial page may also be customized. For instance, one customized page may include various purpose classifications, including an add classification for customer requests to add a new product to an account, and a remove classification for customer requests to remove an existing product from the account. In addition, that customized page or a subsequent page may display products for selection by the CSR to indicate which product or products are pertinent to the call. At block 224, page generator 28 may detect that the CSR has selected an object such as a hyperlink on the customized page, and at block 226, page generator 28 may extract input data from the page. For example, page generator 28 may determine which of the purpose classifications was selected by the CSR and which of the products was selected by the CSR.

The paragraph beginning on line 24 of column 8:

Should read: FIG. 11 depicts an example user interface with scripted messages generated according to the process of FIG. 10. Specifically, FIG. 11 illustrates an example of output that may be produced in display 15 when a customized page is fed into [[to]] a web browser object in workstation 12. For instance, the customized page may be the initial page, and

UNITED STATES PATENT AND TRADEMARK OFFICE
CERTIFICATE OF CORRECTION

PATENT NO. : 7,215,757 B2
APPLICATION NO. : 10/970236
DATED : May 8, 2007
INVENTOR(S) : Stanford E. Pennington, Jr. et al.

It is certified that error appears in the above-identified patent and that said Letters Patent is hereby corrected as shown below:

the generation of that page may have included the step of replacing a macro identifier in a corresponding panel template with the first name of the CSR, "Melissa."

The paragraph beginning on line 33 of column 8:

Should read: FIG. 12 depicts another example of output that may be produced when a customized page is fed into [[to]] a web browser object. Is indicated by the hollow arrows at the bottom of the screen, that page includes a number of hyperlinks. However, when the page was generated, numerous additional hyperlinks may have been omitted as a result of evaluation results for link conditions associated with those links. For instance, the illustrated screen provides guidance for upselling a customer, and it is based on a corresponding template. If link processor 56 found any links in that template relating to products already on the customer account, page generator 28 may have omitted the content for those links from the page. For example, if the template included a link to upsell Call Waiting, but the customer account already included Call Waiting, the link for Call Waiting would be omitted from the page. Boolean compiler 57 in link processor 56 may use the key account data for the customer when evaluating the link conditions in a given panel template. Other components that may be used by Boolean compiler 57 to evaluate link conditions include combinations of elements such as greater than, less than, equal to, true and false, is a product is available, subscribed to, as well as the value or range of marketing intelligence data that may reside in data storage 33 or SQL database 32.

<u>Col. 12, line 4, in the Claims</u>:

Should read: 17. The computer readable medium of claim 16, wherein the page generator is operable to log the CSR navigation through the series of hyperlinked pages to a log database.

Signed and Sealed this

First Day of January, 2008

JON W. DUDAS
*Director of the United States Patent and Trademark Office*